(12) United States Patent
Tian et al.

(10) Patent No.: US 9,120,937 B2
(45) Date of Patent: Sep. 1, 2015

(54) ENERGY CURED COATING COMPOSITION AND PROCESS OF APPLYING SAME TO SUBSTRATE

(71) Applicant: ARMSTRONG WORLD INDUSTRIES, INC., Lancaster, PA (US)

(72) Inventors: Dong Tian, Lancaster, PA (US); Larry W. Leininger, Akron, PA (US); Rebecca L. Winey, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 297 days.

(21) Appl. No.: 13/626,147

(22) Filed: Sep. 25, 2012

(65) Prior Publication Data
US 2013/0085218 A1 Apr. 4, 2013

Related U.S. Application Data

(60) Provisional application No. 61/541,398, filed on Sep. 30, 2011.

(51) Int. Cl.
| | | |
|---|---|---|
| *C08K 5/00* | (2006.01) |
| *C09D 7/12* | (2006.01) |
| *C09D 4/00* | (2006.01) |
| *B05D 5/02* | (2006.01) |
| *B05D 1/28* | (2006.01) |
| *C09D 5/28* | (2006.01) |

(52) U.S. Cl.
CPC ............... *C09D 7/1283* (2013.01); *C09D 4/00* (2013.01); *B05D 1/28* (2013.01); *B05D 5/02* (2013.01); *B05D 2601/20* (2013.01); *C09D 5/28* (2013.01)

(58) Field of Classification Search
CPC ............ B05D 1/28; B05D 1/24; B05D 7/227; C09D 133/16
USPC .............. 524/399, 555; 525/218; 427/428.01, 427/487
See application file for complete search history.

(56) References Cited

U.S. PATENT DOCUMENTS

| | | | |
|---|---|---|---|
| 6,399,670 B1 | 6/2002 | MacQueen et al. |
| 6,730,388 B2 | 5/2004 | MacQueen et al. |
| 6,790,512 B2 | 9/2004 | MacQueen et al. |
| 6,841,221 B2 | 1/2005 | MacQueen |
| 2002/0023587 A1* | 2/2002 | Burgard ........................ 118/683 |
| 2002/0156143 A1 | 10/2002 | Sigel et al. |
| 2008/0081158 A1 | 4/2008 | Winey et al. |
| 2008/0081875 A1 | 4/2008 | Tian et al. |
| 2008/0081882 A1 | 4/2008 | Tian et al. |
| 2008/0113182 A1 | 5/2008 | MacQueen et al. |
| 2008/0145673 A1 | 6/2008 | Bonnard |
| 2009/0275674 A1 | 11/2009 | Tian et al. |
| 2011/0159298 A1 | 6/2011 | Nesbitt et al. |
| 2012/0015110 A1 | 1/2012 | Tian et al. |

FOREIGN PATENT DOCUMENTS

| | | |
|---|---|---|
| JP | 10128205 A | 5/1998 |
| JP | 2006205018 A | 8/2006 |
| WO | 0153387 A1 | 7/2001 |
| WO | 03029373 A2 | 4/2003 |

OTHER PUBLICATIONS

International Search Report and Written Opinion received in PCT/US2012/057020, mailed Mar. 5, 2013.

* cited by examiner

*Primary Examiner* — Hannah Pak
(74) *Attorney, Agent, or Firm* — Michael U. Lee

(57) ABSTRACT

Disclosed is an energy curable coating composition for roll coating, a product, and continuous process of applying the energy curable coating composition to a substrate. The energy curable coating composition has a substantially constant viscosity and includes an energy curable resin having plurality of texturing particles suspended therein. The substantially constant viscosity of the energy curable coating composition remains at least less than about 1500 centipoise at approximately 15° C. to approximately 40° C., during recirculation, in a coating pan, and prior to application using a roll coating apparatus. The plurality of texturing particles provide a predetermined texture to a cured energy coating composition. The continuous process of applying the energy curable coating to a substrate allows the process to continuously operate until the energy curable coating composition is depleted from the container.

12 Claims, 6 Drawing Sheets

ENERGY CURED COATING COMPOSITION AND PROCESS OF APPLYING SAME TO SUBSTRATE

CROSS-REFERENCE TO RELATED APPLICATIONS

This patent application claims the benefit of U.S. Provisional Patent Application Ser. No. 61/541,398 filed on Sep. 30, 2011, and entitled "ENERGY CURED COATING COMPOSITION AND PROCESS OF APPLYING SAME TO SUBSTRATE," the disclosure of which is incorporated by reference as if fully rewritten herein.

FIELD OF THE INVENTION

The present invention relates to energy curable compositions for textured products and processes of fabricating such products. More specifically, the present invention relates to a 100% solids energy cured coating composition, products made from the 100% solids energy cured coating composition, and a process of applying the energy cured coating composition to a substrate using a roll coater.

BACKGROUND OF THE INVENTION

Coatings having textured particles that are applied with a roll coater experience increased viscosity over time in the container or tote holding the coating composition as the coating is applied to a substrate. The viscosity build-up in the tote holding the coating results in limited production time. The viscosity build-up in the tote also results in scrap coating because the high viscosity of the coating in the tote becomes unusable with a roll coater. Such drawbacks of roll coated sheet products can be intensified when texture is required in the products.

In practice, to achieve a textured or rough coating, particles having a larger particle diameter than the applied coating thickness are added to the coating. One of the drawbacks to using this method is that a portion of the larger texture particles do not pass through the nip for the roller coater and are filtered out which increases the percentage of particles in the remaining coating circulating in the tote. This increase in percentage of particles in the circulating coating causes the increase in viscosity in the circulating coating in tote.

An energy curable coating composition having textured particles, a product having an energy curable coating composition, and a continuous process for applying the energy curable coating composition to a substrate using a roller coater that do not suffer from one or more of the above drawbacks is desirable in the art.

BRIEF DESCRIPTION OF THE INVENTION

According to an embodiment, an energy curable coating composition for a roll coating apparatus having a substantially constant viscosity is provided. The energy curable coating composition comprises a mixture of an energy curable resin and a plurality of texturing particles suspended within the energy curable resin. The substantially constant viscosity of the energy curable coating composition remains at least less than about 1500 centipoise at approximately 15° C. to approximately 40° C., during recirculation, in a coating pan, and prior to application using the roll coating apparatus.

According to another embodiment, a product is provided. The product includes a substrate and an energy curable coating composition applied to the substrate. The energy curable coating composition includes an energy curable resin and a plurality of texturing particles suspended within the energy curable resin. The viscosity of the energy curable coating composition prior to curing remains at least less than about 1500 centipoise at approximately 15° C. to approximately 40° C., during recirculation, in a coating pan, and prior to application using a roll coating apparatus. The energy curable coating composition is cured using an energy source to form a cured energy coating composition having a predetermined texture.

According to another embodiment, an energy curable coating composition capable of being applied continuously to a substrate on a roll coating apparatus with an applicator roll is provided. The energy curable coating composition includes an energy curable resin and a plurality of texturing particles suspended within the energy curable resin. In one embodiment, plurality of texturing particles 408 have an average particle size of approximately 10 microns to approximately 80 microns, and a particle hardness of approximately 70-90 Shore D hardness. The viscosity of the energy radiation curable coating composition remains at least less than about 1500 centipoise at approximately 15° C. to approximately 40° C., during recirculation, in a coating pan, and prior to and immediately after roll coating the energy curable coating onto the substrate with the applicator roll. The applicator roll applying the energy curable coating composition has an approximately 15-25 Shore A durometer hardness.

According to another embodiment, a continuous process of applying an energy curable coating to a substrate is provided. The continuous process includes providing a roll coating apparatus having a coater nip, metering roll, an applicator roller, a coating pan, and recirculating line. The continuous process includes providing an energy curable coating composition in a container, the container supplying the coater nip with the energy curable radiation coating composition and the container adapted to receive the energy curable coating composition from the recirculating line. The energy curable composition includes an energy curable resin and a plurality of texturing particles suspended within the energy curable resin. The viscosity of the energy curable coating composition remains at least less than about 1500 centipoise at approximately 15° C. to approximately 40° C., during recirculation, in the coating pan, and prior to application using the roll coating apparatus. The continuous process includes delivering the energy curable coating composition from the container to the roll coating apparatus and coating a substrate with at least one layer of the energy curable coating composition from the applicator roller. The continuous process includes recirculating the energy curable coating composition from the roll coating apparatus back to the container through the recirculation line and continuing to repeat the process until the energy curable coating composition is depleted from the container.

The energy curable coating composition provides a substantially consistent viscosity of at least less than 1500 centipoise during roll coating. The energy curable coating composition and resulting cured coating of the present invention provides a top coat or protective coating having a texture to substrates containing plastic (e.g. polyvinyl chloride), metal, cellulose, fiberglass, wood, and ceramic, among others. In an exemplary embodiment the energy curable coating composition of the present invention is used in connection with sheet flooring or floor tiles. The energy curable coating composition and resulting cured coating of the present invention provide superior scratch or abrasion resistance and good transparency. In addition, the coating composition and resulting coating of the present invention is easily cleanable, and the texture provides an aesthetic aspect to the coating. The energy curable coating composition allows for continuous roll coating application to a substrate without viscosity increase in the container providing the energy curable coating composition. The energy curable coating composition, because of the reduced viscosity, eliminates or reduces waste and scrap material from the roll coating process because the full amount of the energy curable coating composition in a container is usable in the continuous roll coating operation.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

It should be appreciated that the term "energy curable" includes various curing methods, such as but not limited to radiation curing, thermal curing and other suitable curing methods. The energy curing method used depends on the underlying resin. Examples of energy curing methods include, but are not limited to UV-curing, LED-curing, thermal curing, electron-beam curing, cationic curing, and combinations thereof.

A radiation-curable resin may be any resin capable of being cured using radiant energy. Radiant energy can be transferred through wave phenomenon and subatomic particle movement. Most preferred forms of radiant energy are ultraviolet (UV) and electron beam energy. A thermally-curable resin may be any resin capable of being cured using thermal energy.

Preferably, the radiation-curable resin comprises organic monomers, oligomers, or both. Radiation curable resins include reactive groups, such as, but are not limited to, acrylate, vinyl, lactone, oxirane, vinyl ether, and hydroxyl groups, wherein the reactive groups provide the functionality for polymerization upon exposure to radiation. Suitable examples of radiation curable resins include, but are not limited to acrylated polyether, acrylated polyester, acrylated urethane, and combinations thereof.

Preferably, the thermally-curable resin comprises organic monomers, oligomers, or both. Thermally curable resins include reactive groups, such as, but are not limited to, acrylate, vinyl, lactone, oxirane, vinyl ether, and hydroxyl groups, wherein the reactive groups provide the functionality for polymerization upon exposure to heat. Suitable examples of thermally curable resins include, but are not limited to polyester polyol, polyether polyol or urethane. In another embodiment energy curable resin can be a mixture of the radiation-curable and thermally-curable resins.

The energy curable coating composition includes additives, such as but not limited to initiators (e.g. photo-initiators or thermal-initators), wetting agents, flattening agents, reactive solvents, anti-microbial agents, and combinations thereof. In one embodiment, the total weight percent of the energy curable coating composition is approximately 64 percent to approximately 84 percent by weight energy curable resin, approximately 15 percent to approximately 35 percent by weight of textured particles, approximately 1 percent to approximately 5 percent by weight initiators, approximately 0.1 percent to approximately 2 percent by weight wetting agents, approximately 0 percent to approximately 10 percent by weight flattening agents, approximately 0 percent to approximately 5 percent by weight reactive solvents, approximately 0 percent to approximately 1 percent by weight anti-microbial agents, combinations thereof, and other suitable energy curable coating composition additives.

Figure 1:
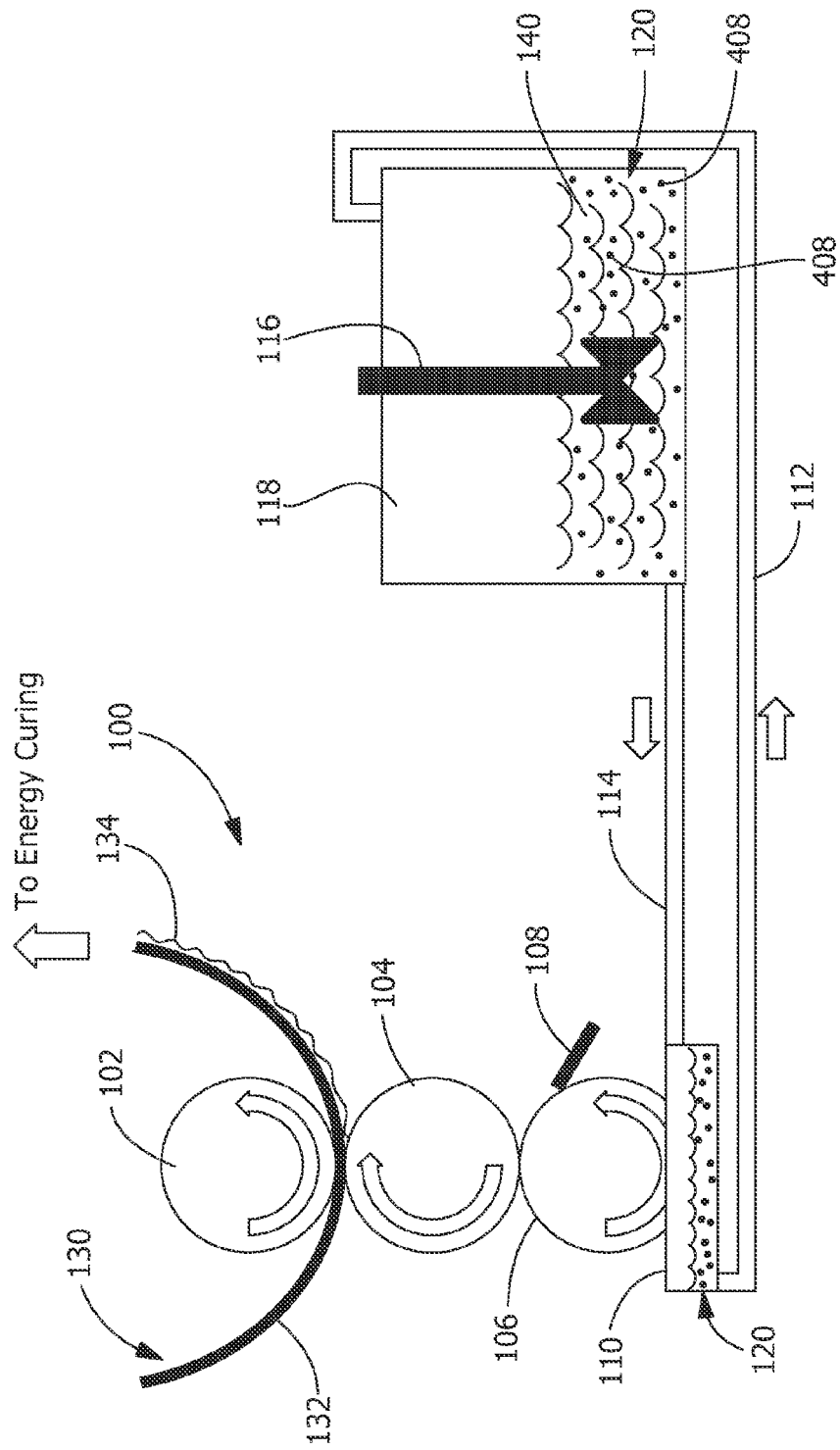
FIG. 1 is a schematic of a first configuration of roll coating apparatus according to an embodiment of the disclosure.
Figure 2:
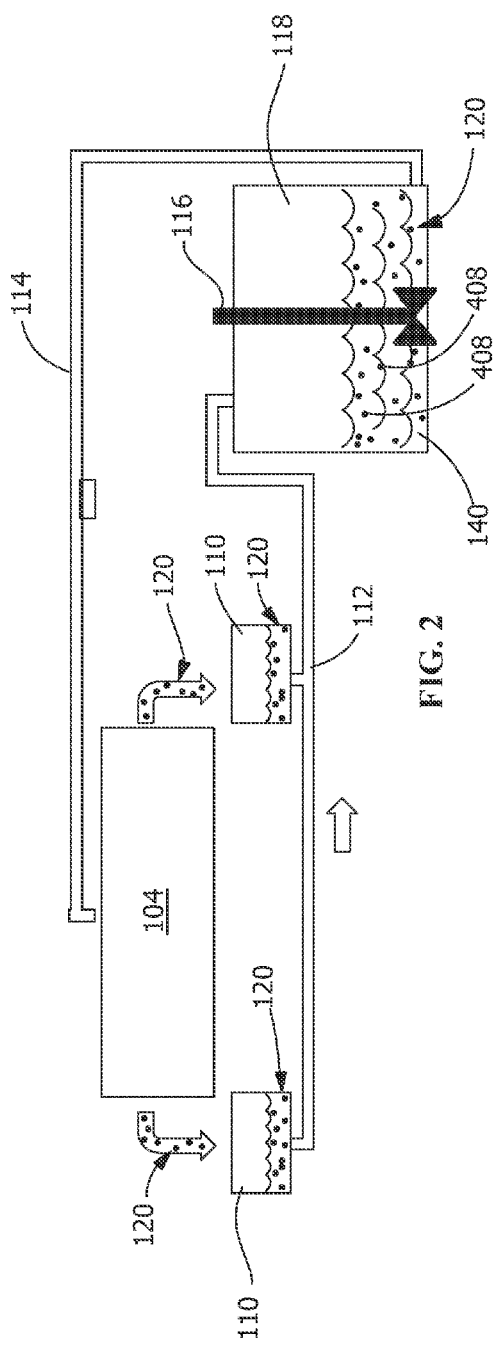
FIG. 2 is a schematic of a front view of a second configuration of roll coating apparatus according to an embodiment of the disclosure.
Figure 3:
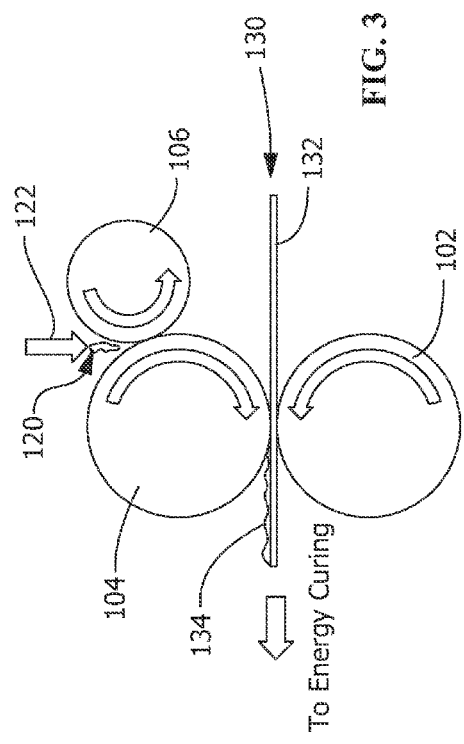
FIG. 3 is a schematic of a side view of the roll coating apparatus of FIG. 2 according to an embodiment of the disclosure.

As shown in FIGS. 1-3, an energy curable coating composition 120 for use with a roll coating apparatus 100 having a substantially constant viscosity is provided. The energy curable coating composition 120 includes a mixture of an energy curable resin 140 and a plurality of texturing particles 408 suspended in energy curable resin 140. Energy curable coating composition 120 can also include any number of additives. The substantially constant viscosity of energy curable coating composition 120 remains at least less than about 1500 centipoise (Cps) at approximately 15° C. to approximately 40° C., during recirculation, in a coating pan, and prior to application using the roll coating apparatus 100. In one embodiment, the substantially constant viscosity of energy curable coating composition 120 is approximately 400 Cps to approximately 1500 Cps, or alternatively approximately 400 Cps to approximately 1200 Cps, or alternatively approximately 500 to approximately 1000 Cps. Plurality of texturing particles 408 provide a predetermined texture to cured energy coating composition 404 (see FIGS. 4-5). The predetermined texture has an arithmetical mean roughness ($R_a$) of approximately 2.92 microns (approximately 115 microinches) to approximately 4.60 microns (181 microinches). The predetermined texture has a ten-point mean roughness ($R_z$) value of approximately 12.27 microns (approximately 483 microinches) to approximately 20.50 microns (approximately 807 microinches). The predetermined texture has a maximum valley depth ($R_v$) of approximately 5.82 microns (approximately 229 microinches) to approximately 9.73 microns (approximately 383 microinches). The predetermined texture has a maximum valley peak ($R_p$) of approximately 6.10 microns (approximately 240 microinches) to approximately 11.18 microns (approximately 440 microinches). The predetermined texture has and a maximum height of profile ($R_t$) of approximately 19.94 microns (approximately 785 microinches) to approximately 34.67 microns (approximately 1365 microinches).

The energy curable resin 140 of the energy curable coating composition 120 is a UV-curable resin, a thermally curable resin, an electron-beam curable resin, cationic curable resin, and combinations thereof and can be selected from any of the resins discussed above.

Plurality of texturing particles 408 of energy curable coating composition 120 are selected from particles that are spherical, non-spherical, and a combination thereof. In one embodiment, plurality of texturing particles 408 are selected from only spherical particles, such a polymethyl methacrylate (PMMA) particles. Plurality of texturing particles 408 comprise approximately 15 percent to approximately 35 percent by weight, or alternatively 17 percent to approximately 28 percent by weight, or alternatively approximately 17 percent to approximately 22 percent by weight of the total weight of energy curable coating composition 120. Plurality of texturing particles 408 have an average particle size of approximately 10 microns to approximately 80 microns, or alternatively approximately 15 microns to approximately 75 microns, or alternatively approximately 20 microns to approximately 70 microns. In one embodiment, plurality of texturing particles 408 include organic polymers and/or inorganic materials. Plurality of texturing particles 408 have a particle hardness of approximately 70 Shore D hardness to approximately 90 Shore D hardness for organic polymers, and minimum 5 Mohs for inorganic textured particles. Plurality of texturing particles 408 are selected from wax particles, such as polyethylene, polypropylene (e.g., PROPYL-TEX 200SF, available from Micro Powders, Inc., Tarrytown, N.Y.), polymethyl methacrylate (PMMA) (e.g., ALTU-GLAS® BS100, available from Altuglas International Philadelphia, Pa.), zinc acetate, glass microspheres, ceramic microspheres, polystyrene, sodium-potassium alumia-silicate particles and a combinations thereof. In one embodiment, plurality of texturing particles 408 are selected from polymethyl methacrylate (PMMA), zinc acetate, and a combination thereof. In yet another embodiment, energy curable coating composition 120 includes only polymethyl methacrylate (PMMA) as plurality of texturing particles 408. When plurality of texturing particles 408 include only PMMA, plurality of texturing particles are selected from a first polymethyl methacrylate (PMMA) material having a first particle diameter and a second polymethyl methacrylate (PMMA) material having a second particle diameter (e.g. DYNOADD® P-520 and DYNOADD® P-530, available from Dynea Riverview, Mich.). The first particle diameter of the first PMMA material is approximately 10 microns to approximately 40 microns and the second particle diameter of the second PMMA material is approximately 15 microns to approximately 60 microns.

In one embodiment, without being bound by theory, it is believed that an increase in the particle size distribution of plurality of textured particles 408 should be proportional to an increase in thickness of the coating of the energy curable coating composition 120 on substrate 130 coating thickness, while at the same time still maintaining the same ratios of the types of particles for plurality of textured particles 408. Therefore, in theory, if the initial coating thickness of the energy curable coating composition 120 was approximately 12.70 microns (0.50 mil) and the diameter of the plurality of textured particles 408 is approximately 10 microns to approximately 80 microns, then when the thickness of the energy curable coating composition 120 should be approximately 25.40 microns (1.0 mil) and the diameter of the plurality of textured particles 408 should be approximately 20 microns to approximately 160 microns.

In one embodiment, without being bound by theory, it is believed that the ratio of particle hardness of plurality of textured particles 408 to applicator roll 104 hardness is approximately 2.8 to approximately 6.0 or higher to keep and maintain viscosity of energy curable coating composition 120 at a value of less than approximately 1500 Cps. In one embodiment, when plurality of textured particles 408 have a hardness of approximately 70 Shore D hardness to approximately 90 Shore D hardness, applicator roll 104 will have a hardness of approximately 20 Shore A durometer hardness to approximately 25 Shore A durometer hardness.

Energy curable coating composition 120 is capable of being applied continuously to substrate 30 with roll coating apparatus 100, such as the ones depicted in FIGS. 1-3. FIG. 1 is a schematic of roll coating apparatus 100 including back up roll 102, applicator roll 104, metering roll 106, doctor blade 108, coating pan 110, supply line 114 and recirculating line 112. Energy curable composition 120 is provided in a container 118 or tote. Generally, containers 118 hold approximately 1000 kilograms (approximately 2200 pounds) of energy curable coating composition 120. Energy curable coating composition 120 is continuously agitated or stirred in container 118 by an agitation member 116.

As shown in FIG. 1, energy curable coating composition 120 is supplied from container 118 though supply line 114 that connects to coating pan 110 of roll coating apparatus 100. Metering roll 106 is situated to receive energy curable coating composition 120 from coating pan 110. In this embodiment, doctor blade 108 removes excess energy curable coating composition 120, which returns to coating pan 110. Coating pan 110 continuously receives energy curable coating composition 120 from supply line 114 and simultaneously continuously returns energy curable coating composition 120 to container 118 to maintain desired energy curable coating composition 120 level in coating pan 110. While energy coating composition 120 is circulated between coating pan 110 and container 118, the viscosity of energy curable coating composition remains at least less than 1500 Cps and more preferably at approximately 400 Cps to approximately 1500 Cps, and alternatively at approximately 400 Cps to approximately 1000 Cps, such that the roll coating operation can be continued because there is no appreciable viscosity increase in container 118. Metering roll 106 transfers desired thickness of energy curable coating composition 120 onto applicator roll 104. Applicator roll 104 applies at least one layer of energy curable coating composition 120 to uncoated substrate 132 to obtain coated substrate 134. After substrate 130 is coated with energy curable coating composition 120, coated substrate 134 is cured using an energy source. Coating thickness of energy curable coating composition 120 on substrate 130 is approximately 2.54 microns (0.10 mil.) to approximately 127.00 microns (5.00 mils), or alternatively approximately 12.70 microns (0.50 mil) to approximately 101.60 microns (4.00 mils), or alternatively approximately 19.05 microns (0.75 mils) to approximately 76.2 microns (3.00 mils). In an alternative embodiment coating thickness of energy curable coating composition 120 on substrate 130 is approximately 7.60 microns (0.30 mils) to approximate 13.20 microns (0.52 mils).

FIGS. 2-3 illustrate an alternative embodiment of roll coating apparatus 100. Roll coating apparatus 100 includes back up roll 102, applicator roll 104, metering roll 106, coating nip 122, coating pan 110, supply line 114 and recirculating line 112. Energy curable composition 120 is provided in a container 118 or tote. Energy curable coating composition 120 is continuously agitated or stirred in container 118 by an agitation member 116. As shown in FIG. 2, energy curable coating composition 120 is supplied from container 118 though supply line 114 that connects to coating pan 110 of roll coating apparatus 100. Turning to FIG. 3, coating nip 122 deposits energy curable coating composition 120 adjacent to metering roll 106 and applicator roll 104. In this embodiment, metering roll 106 and applicator roll 104 are turning in opposite directions. As metering roll 106 deposits energy curable coating composition 120 onto applicator roll 104 the additional energy curable coating composition 120 flows off the side of applicator roll 104 into coating pans 110. Coating pans 110 continuously return energy curable coating composition 120 to container 118 to maintain desired energy curable coating composition 120 level in coating pan 110. While energy coating composition 120 is circulated between coating pan 110 and container 118, the viscosity of energy curable coating composition remains at least less than 1500 Cps and more preferably at approximately 400 Cps to approximately 1500 Cps, and alternatively at approximately 400 Cps to approximately 1000 Cps, such that the roll coating operation can be continued because there is no appreciable viscosity increase in container 118. Metering roll 106 transfers desired thickness of energy curable coating composition 120 onto applicator roll 104. Applicator roll 104 applies at least one layer of energy curable coating composition 120 to uncoated substrate 132 to obtain coated substrate 134. In this embodiment, back up roll 102 is rotating in the opposite direction of applicator roll 104 and assists in feeding substrate 130. After substrate 130 is coated with energy curable coating composition 120, coated substrate 134 is cured using an energy source. Coating thickness of energy curable coating composition 120 on substrate 130 is approximately 2.54 microns (0.10 mil.) to approximately 127.00 microns (5.00 mils), or alternatively approximately 12.70 microns (0.50 mil) to approximately 101.60 microns (4.00 mils), or alternatively approximately 19.05 microns (0.75 mils) to approximately 76.2 microns (3.00 mils). In an alternative embodiment coating thickness of energy curable coating composition 120 on substrate 130 is approximately 7.60 microns (0.30 mils) to approximate 13.20 microns (0.52 mils).

Figure 5:
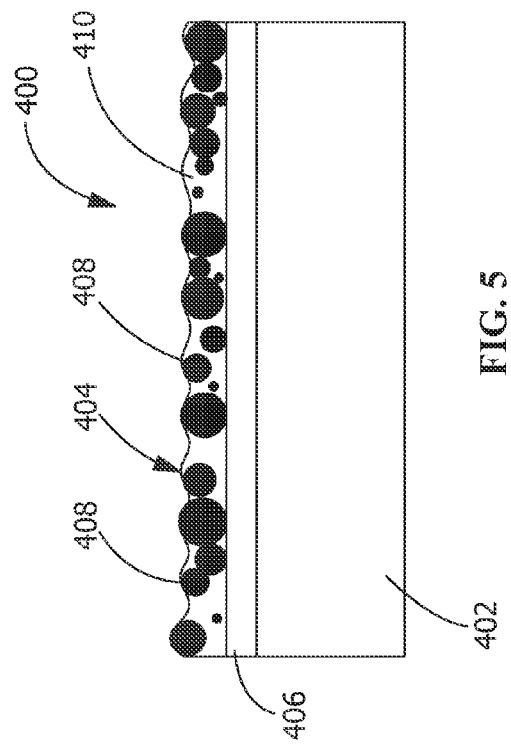
FIG. 5 is a schematic of a product including a substrate and a textured coating according to an embodiment of the disclosure.
Figure 4:
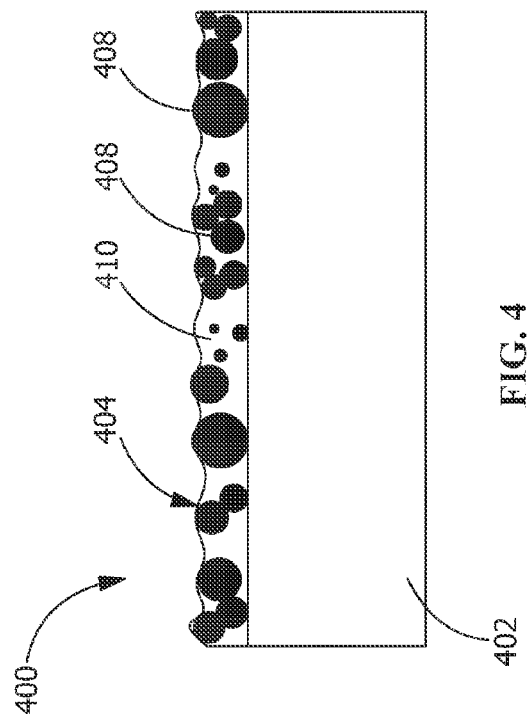
FIG. 4 is a schematic of a product including a substrate and a textured coating according to an embodiment of the disclosure.

Referring to FIG. 4, in one embodiment, a product 400 includes a substrate 402 and a cured energy coating composition 404 applied directly thereon. As previous described, cured energy coating composition 404 is applied using roll coating apparatus 100 (see FIGS. 1-3). In a second embodiment, as shown in FIG. 5, product 400 includes substrate 402 and cured energy coating composition 404 applied indirectly thereon. Product 400 of FIG. 5 includes an intermediate layer 406 applied to substrate 402, and energy cured coating applied to intermediate layer 406. Intermediate layer 406 can include a single layer or any number of layers, such as, but not limited to adhesives, laminates, clearcoats printed films, and combinations thereof. Cured energy coating composition 404 has predetermined texture having an arithmetical mean roughness ($R_a$) of approximately 2.92 microns to approximately 4.60 microns, a ten-point mean roughness ($R_z$) value of approximately 12.27 microns to approximately 20.50 microns, a maximum valley depth ($R_v$) of approximately 5.82 microns to approximately 9.73 microns, a maximum valley peak ($R_p$) of approximately 6.10 microns to approximately 11.18 microns, and a maximum height of profile ($R_t$) of approximately 19.94 microns to approximately 34.67 microns. Product 404, including cured energy coating composition 404, prior to any additional processing has a gloss of approximately 9 to approximately 23 measured at 60 degree angle. Product 404, including cured energy coating composition 404, after additional manufacturing steps has a gloss of approximately 2 to 13 measured at 60 degree angle.

Figure 6:
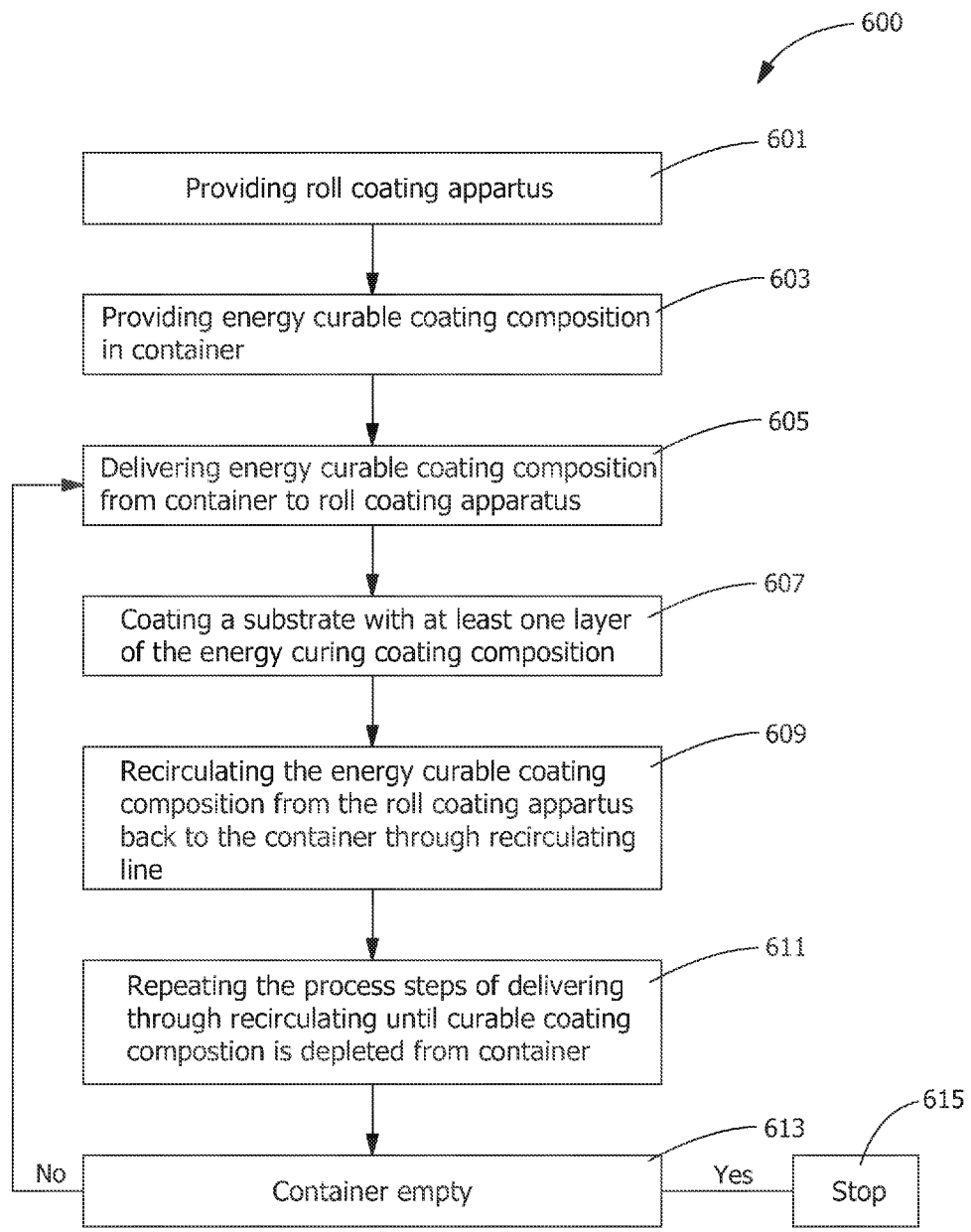
FIG. 6 is a flow chart of an exemplary process of forming a textured coating for a product according to an embodiment of the disclosure.

Referring to FIG. 6, in one embodiment, a continuous process 600 of applying the energy curable coating composition 120 to a substrate 402 to form product 400 (see FIGS. 4 and 5). Continuous process 600 includes providing roll coating apparatus 100, step 601 (see FIGS. 1-3). Continuous process 600 includes providing energy curable coating composition 120 in container 118, step 603 (see FIGS. 1-3). Continuous process 600 includes delivering energy curable coating composition 120 from container 118 to roll coating apparatus 100, through supply line 114, step 605 (see FIGS. 1-3). Continuous process 600 includes coating a substrate 402 using roll coating apparatus 100 with at least one layer of energy curable coating composition 120, step 607 (see FIGS. 1-3). Continuous process 600 includes recirculating energy curable coating composition 120 from roll coating apparatus 100 back to container 118 through recirculating line 112, step 609 (see FIGS. 1-3). Generally, coating pan 110 collects additional energy curable coating composition 120 and is connected to recirculating line 112. Continuous process 600 includes repeating process steps delivering energy curable coating composition, step 605 through recirculating, step 609 until curable coating composition is depleted from container, step 611. If container 118 has energy curable coating composition 120 steps 605-609 are repeated, (see FIGS. 1-3). If container 118 is empty, continuous process is stopped, step 615.

EXAMPLES

The following energy curing coating compositions were prepared and the formulations are given in weight percent of the total coating composition (before curing):

TABLE 1

Energy Curable Coating Compositions

| | Formulas (Wt. %) | | | | | |
|---|---|---|---|---|---|---|
| Ingredients | Control | #1 | #2 | #3 | Description | Manufacturer |
| EC6360 | 27.54 | 27.17 | 27.17 | 27.53 | polyester acrlyates | Eternal Chemical |
| Desmolux XP2513 | 11.81 | 11.65 | 11.65 | 11.81 | urethane acrylates | Bayer Material Science |
| Tricyclodecane dimethanol diacrylate | 15.74 | 15.53 | 15.53 | 15.74 | acrylate monomer | |
| Cyclic Trimethylolpropane Formal Acrylate | 7.08 | 6.99 | 6.99 | 7.08 | monofunctional acrylate monomer | |
| Trimethylolpropane Triacrylate | 5.50 | 5.43 | 5.43 | 5.50 | acrylate monomer | |
| 2-Phenoxythyl Acrylate | 7.08 | 6.99 | 6.99 | 7.08 | acrylate monomer | |
| CN 371 | 2.31 | 2.28 | 2.28 | 2.31 | amine coinitiator | Sartomer USA, LLC |

TABLE 1-continued

Energy Curable Coating Compositions

| | Formulas (Wt. %) | | | | |
|---|---|---|---|---|---|
| Ingredients | Control | #1 | #2 | #3 | Description | Manufacturer |
| BYK 3530 | 0.62 | 0.61 | 0.61 | 0.62 | wetting agent | BYK Additives & Instruments |
| Diphenyl ketone | 2.40 | 2.37 | 2.37 | 2.40 | photoinitiator | |
| 1-Hydroxycyclohexyl phenyl ketone | 0.60 | 0.59 | 0.59 | 0.60 | photoinitiator | |
| PropylTex 200SF | 17.72 | — | 13.41 | 6.41 | Polypropylene particles | Micro Powders, Inc. |
| Altuglas BS100 | — | 17.48 | 4.07 | — | PMMA beads | Altuglas International of Arkema Group |
| Dynoadd P520 | — | — | — | 2.85 | small PMMA sphere | Dynea |
| Dynoadd P530 | — | — | — | 7.12 | large PMMA sphere | Dynea |
| Disperbyk 185 | 0.40 | 0.39 | 0.39 | 0.40 | wetting and dispersing additive | BYK Additives & Instruments |
| Zinc Acetate | 1.19 | 2.51 | 2.51 | 2.54 | texturing particle | |
| Total Weight Percent | 100.00 | 100.00 | 100.00 | 100.00 | | |

Figure 7:
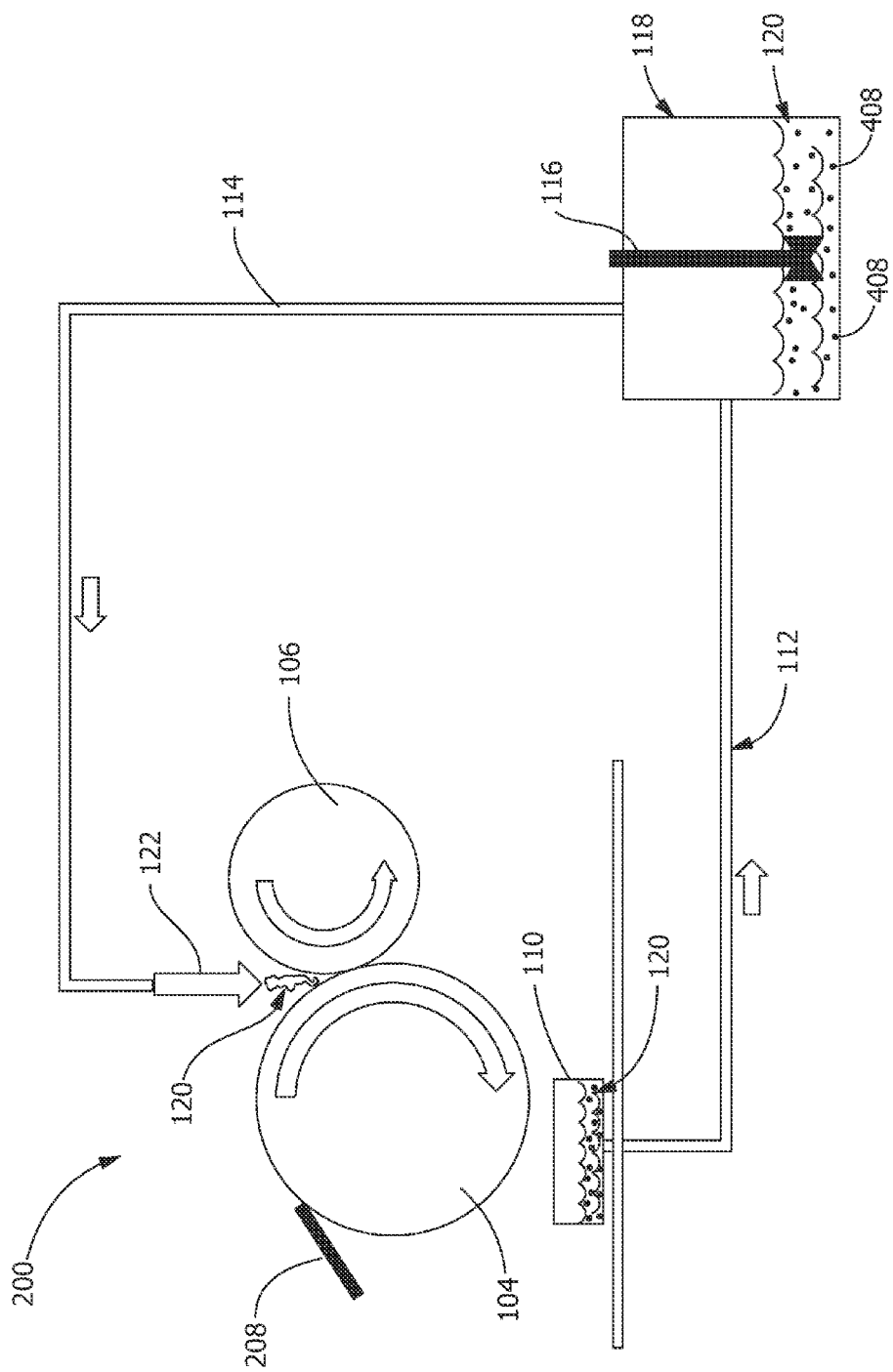
FIG. 7 is a schematic of a modified roll coating apparatus according to an embodiment of the disclosure.

To test viscosity of the various coating composition formulations in Table 1 (Control, Formula 1, Formula 2 and Formula 3) a modified roll coating apparatus 200, as shown in FIG. 7 was used. Modified roll coating apparatus 200 simulates continuous roll coating on a substrate, without actually coating on a substrate. Instead of coating on the substrate, a wiping blade 208 removes the amount of energy curable coating composition 120 that would be applied to substrate from applicator roll 104. As shown in FIG. 7, like roll coating apparatus 100 (see FIGS. 1-3), modified roll coating apparatus 200, includes a metering roll 106, applicator roll 104, coating nip 122 and coating pan 110. Container 118 holds energy curable coating composition 120. Energy curable coating composition 120 is delivered though supply line 114 to coating nip 122. Coating nip 122 applies energy curable coating composition to metering roll 106, which then in turn transfers energy curable coating composition 120 to applicator roll 104. Modified roll coating apparatus 200 includes a wiping blade 208 that removes the amount of energy curable coating composition 120 that would have been deposited on a substrate if the substrate was coated, and removes that amount of energy curable coating composition 120 from applicator roll 104. Energy curable coating composition wiped from applicator roll 104 by wiping blade 208 is discarded. Excess energy curable coating composition 120 is received in coating pan 110 adjacent to applicator roll 104. From coating pan 110 energy curable coating composition 120 is recirculated through a recirculating line 112 back to container 118. The energy curable coating composition 120 in container 118 is continuously agitated or stirred with agitating member 116 during the continuous process.

Figure 8:
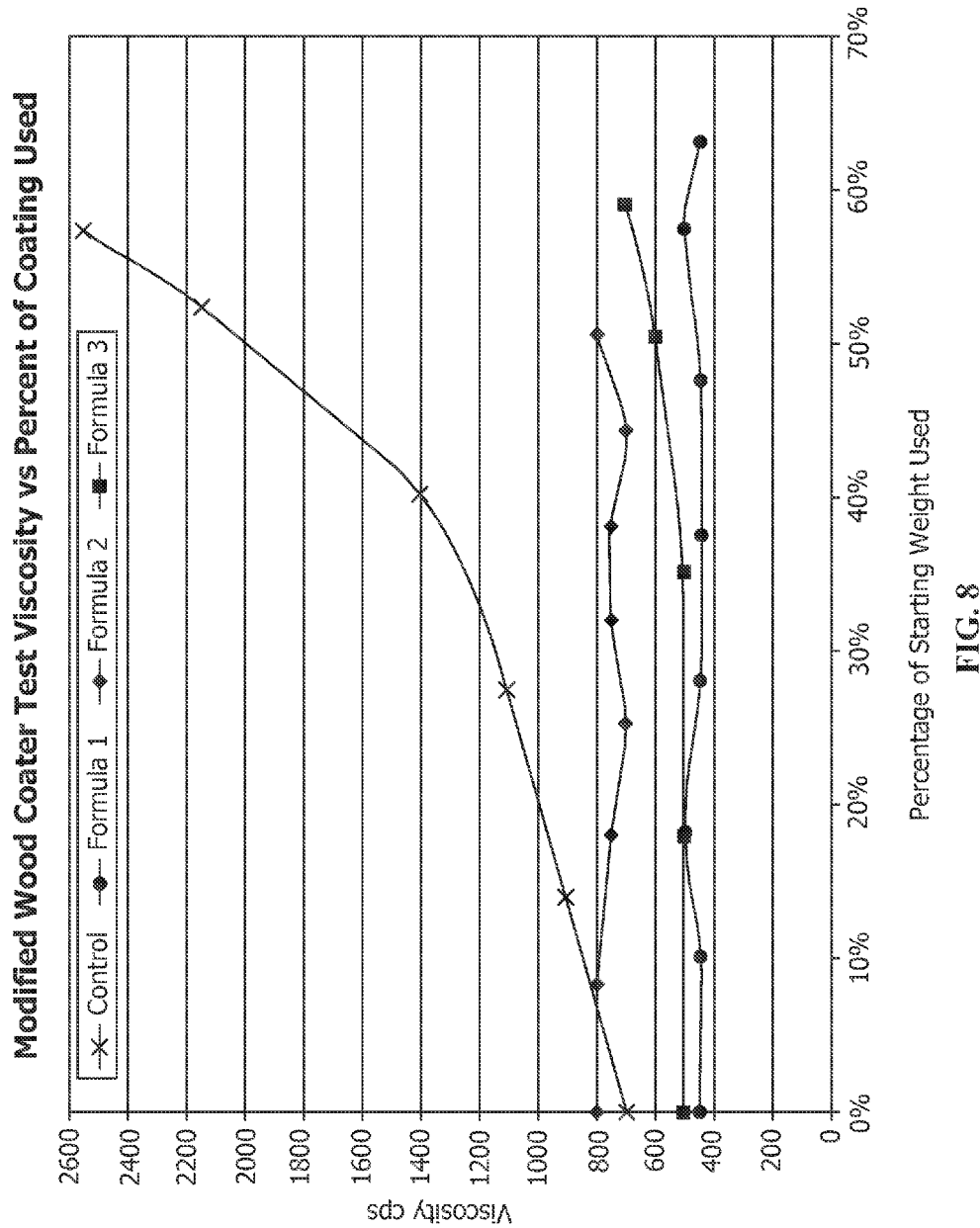
FIG. 8 is a chart illustrating viscosities of the energy curable coating compositions of formulas according to an embodiment of the disclosure.

The modified roll coating apparatus 200 runs continuously until energy curable coating composition 120 is depleted from container 118. As shown in FIG. 8, the viscosity of the control and energy curable coating composition 120 of Formula 1, Formula 2, and Formula 3 were measured in container 118 during the continuous roll coating process using modified roll coating apparatus 200. As indicated by FIG. 8, the Control formulation had a viscosity of approximately 1200 Cps at 40% depletion of coating in container and was well over the usable CPs of 1500 at 45% depletion. The Control coating formulation was only run through 50% depletion of the material because the viscosity as a result of solids build-up was too great to continue coating with the modified roll coating apparatus.

Also shown in FIG. 8, the current disclosure provides an energy curable coating composition that does not result in textured particle build-up in the container. The viscosity of energy curable coating composition in container of Formula 1, Formula 2, and Formula 3 stayed at relatively constant values during continuous coating using modified roll coating apparatus 200. The viscosity of Formula 1, Formula 2, and Formula 3 in container during the continuous coating process (as described above) remained at a range of approximately 400 Cps to approximately 1500 Cps through depletion of 60% energy curable coating composition out of container. The viscosity in container during continuous coating with modified roll coating apparatus 200 was measured using a Brookfield RVT viscometer, spindle #6 at 100 rpm and 23° C.

The energy curable coating compositions of Formulas 1, 2, and 3, were applied to a coupon (test substrate). These coupons were tested for texture, roughness, and gloss. The texture and roughness was measured using a Surtronic Duo profilometer (measurement length=4 mm (0.16 in.). The gloss of the coated coupon was measured using a 60° Gloss Meter to take 10 gloss readings and the average of those ten readings were recorded. The coated coupon was un-embossed, and a gloss reading after this additional processing step was measured. The following properties were measured for Formulas 1, 2, and 3:

TABLE 2

Cured Energy Coating Composition Properties

| Property | Control | Formula 1 | Formula 2 | Formula 3 |
|---|---|---|---|---|
| Gloss | 18.5 | 19.2 | 21.2 | 18.3 |
| Gloss of Embossed product | 9.4 | n/a | n/a | 9.4 |
| Arithmetical mean roughness (Ra) | 134.2 | 124.9 | 116.1 | 129.7 |
| Ten-point mean roughness ($R_z$) | 597.5 | 531.4 | 512.8 | 572.2 |
| Maximum valley depth (Rv) | 260.5 | 225.9 | 207.8 | 263.0 |
| Maximum height of profile (Rt) | 968.3 | 796.7 | 879.0 | 910.1 |
| Maximum valley peak (Rp) | 337.1 | 303.4 | 305.3 | 333.9 |

The Ra, Rz, Rv, Rt, and Rp values are all given in microinches.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A continuous process of applying, an energy curable coating to a substrate, the continuous process comprising: providing a roll coating apparatus having a coater nip, metering roll, an applicator roller, a coating pan, and recirculating line; providing an energy curable coating composition in a container, the container supplying the coater nip with said energy curable radiation coating composition and the container adapted to receive said energy curable coating composition from the recirculating line, said energy curable composition including: an energy curable resin; and a plurality of texturing particles suspended within the energy curable resin; and wherein the viscosity of said energy curable coating composition remains at least less than about 1500 centipoise at 15° C. to 40° C., during recirculation, in the coating pan, and prior to application using the roll coating apparatus, and delivering said energy curable coating composition from the container to the roll coating apparatus; coating a substrate with at least one layer of said energy curable coating composition from the applicator roller; recirculating said energy curable coating composition from the roll coating apparatus back to the container through the recirculation line; repeating the process steps of delivering through recirculating until said energy curable coating composition is depleted from the container.

2. The continuous process of claim 1, wherein the metering roll is selected from the group consisting of smooth ceramic rolls, grooved rubber rolls, gravure roll.

3. The continuous process of claim 1, wherein the applicator roll has a hardness of 15-25 Shore A durometer.

4. The continuous process of claim 1, wherein the container is continuously agitated throughout the process.

5. The continuous process of claim 1, wherein the viscosity of the energy curable coating composition remains at 400 centipoise to approximately 1500 centipoise.

6. The continuous process of claim 1, wherein the substrate having at least one layer of said energy curable coating composition is cured.

7. The continuous process of claim 1, wherein the plurality of texturing particles are selected from the group consisting of polymethyl methacrylate (PMMA), zinc acetate, and a combination thereof.

8. The continuous process of claim 1, wherein the plurality of texturing particles comprise a first polymethyl methacrylate (PMMA) material having a first particle diameter and a second polymethyl methacrylate (PMMA) material having a second particle diameter.

9. The continuous process of claim 1, wherein the plurality of texturing particles are selected from the group consisting of polypropylene, polymethyl methacrylate (PMMA), zinc acetate, and a combination thereof.

10. The continuous process of claim 1, wherein the plurality of texturing particles comprise 15 to 35 percent by weight of the total composition by weight of said energy curable coating composition.

11. The continuous process of claim 1, including an additional step, after the step of coating a substrate, of curing said energy curable coating composition to obtain a cured coating composition.

12. The continuous process of claim 6, wherein the cured coating composition has a predetermined texture of having an arithmetical mean roughness ($R_a$) of 2.92 microns to 4.60 microns, a ten-point mean roughness ($R_z$) value of 12.27 microns to 20.50 microns, a maximum valley depth ($R_v$) of 5.82 microns to 9.73 microns, a maximum valley peak ($R_p$) of 6.10 microns to 11.18 microns, and a maximum height of profile ($R_t$) of 19.94 microns to 34.67 microns.

* * * * *